US012593316B2

(12) United States Patent (10) Patent No.: US 12,593,316 B2
Dong (45) Date of Patent: Mar. 31, 2026

(54) COMMUNICATION METHOD AND COMMUNICATION DEVICE

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 326 days.

(21) Appl. No.: 18/547,165

(22) PCT Filed: Feb. 26, 2021

(86) PCT No.: PCT/CN2021/078228
§ 371 (c)(1),
(2) Date: Aug. 21, 2023

(87) PCT Pub. No.: WO2022/178854
PCT Pub. Date: Sep. 1, 2022

(65) Prior Publication Data
US 2024/0323923 A1 Sep. 26, 2024

(51) Int. Cl.
*H04W 72/04* (2023.01)
*H04L 27/34* (2006.01)
(52) U.S. Cl.
CPC ............. *H04W 72/04* (2013.01); *H04L 27/34* (2013.01)
(58) Field of Classification Search
CPC ... H04L 5/0044; H04L 5/0058; H04L 5/0064;

H04L 5/0092; H04L 27/34; H04L 27/362; H04L 27/366; H04L 2025/03414; H04L 2025/0342; H04W 72/04; H04W 72/53; H04W 84/12
See application file for complete search history.

(56) References Cited

U.S. PATENT DOCUMENTS

| | | | | |
|---|---|---|---|---|
| 11,343,035 | B2 * | 5/2022 | Chen ..................... | H04L 1/0071 |
| 11,805,503 | B2 * | 10/2023 | Park .................. | H04W 72/0453 |
| 12,004,140 | B2 * | 6/2024 | Hu ......................... | H04L 5/0044 |
| 12,284,631 | B2 * | 4/2025 | Lim ..................... | H04L 5/0053 |
| 12,341,721 | B2 * | 6/2025 | Redlich ................. | H04L 5/0053 |
| 2022/0029872 | A1 * | 1/2022 | Cao ....................... | H04L 5/0094 |

FOREIGN PATENT DOCUMENTS

| | | |
|---|---|---|
| CN | 106576020 A | 4/2017 |
| WO | WO 2020175050 A1 | 9/2020 |

OTHER PUBLICATIONS

Yu et al., Multiple RU discussion, IEEE 802.11-19/1914r1, 8 pages, Nov. 2019.*

(Continued)

*Primary Examiner* — Frank Duong
(74) *Attorney, Agent, or Firm* — Finnegan, Henderson, Farabow, Garrett & Dunner, L.L.P.

(57) ABSTRACT
A communication method, includes: determining a first message frame, wherein the first message frame comprises first information, and the first information is configured to indicate at least one of a support capability of applying a single-type resource unit of a first size to a 4096-Quadrature Amplitude Modulation (QAM), or a support capability of applying a multi-type resource unit of the first size to the 4096-QAM; and sending the first message frame.

18 Claims, 2 Drawing Sheets

(56)         References Cited

OTHER PUBLICATIONS

Liu et al., Multiple RU Combinations for EHT, IEEE 802.11-19/1907r2, 32 pages, Nov. 2019.*

International Search Report and Written Opinion of International Application No. PCT/CN2021/078228, dated Nov. 2, 2021, 18 pages.

Notice of first review opinion for Chinese Application No. 202180000509.4, issued on Jun. 30, 2023, 28 pages.

Deng, C., et al., IEEE 802.11be Wi-Fi 7: New Challenges and Opportunities, IEEE Communications Surveys & Tutorials, vol. 22, No. 4, Fourth Quarter 2020, pp. 2136-2166.

Extended European Search Report issued in Application No. 21927290.3 dated Mar. 15, 2024, 10 pages.

Office Action for Russian Application No. 2023124125/07, dated Apr. 11, 2024, 14 pages.

PDT EHT PHY Capabilities Information Field, IEEE P802.11-21/0224r2, dated Feb. 19, 2021, 20 pages.

Office Action issued by the India Patent Office on Nov. 27, 2024, in corresponding Application No. IN 2023-47063848, 5 pages.

* cited by examiner

AP
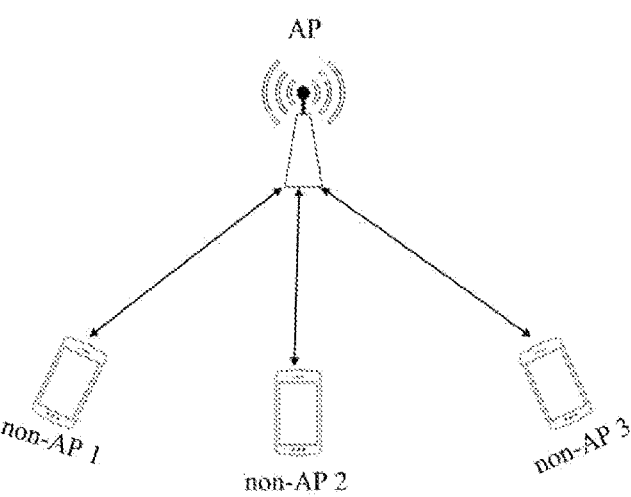
non-AP 1          non-AP 3
non-AP 2
FIG. 1
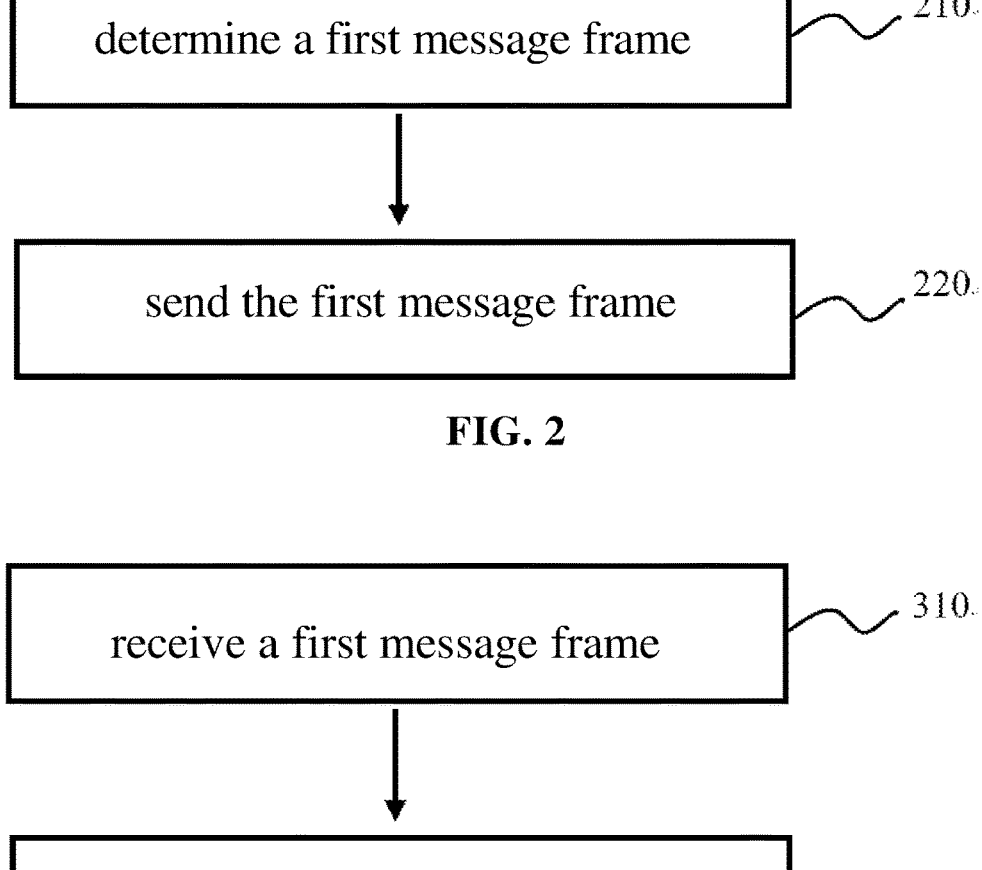
determine a first message frame                    ~210
send the first message frame                       ~220
FIG. 2
receive a first message frame                      ~310
perform a communication operation                  ~320
FIG. 3 communication apparatus 400 processing
module 410 transceiver
module 420

FIG. 4

COMMUNICATION METHOD AND COMMUNICATION DEVICE

CROSS-REFERENCE TO RELATED APPLICATION

This application is a national phase of International Application No. PCT/CN2021/078228, filed on Feb. 26, 2021, the content of which is hereby incorporated by reference in its entirety.

TECHNICAL FIELD

The disclosure relates to a field of communication technologies, in particular to a communication method and a communication apparatus in wireless communication.

BACKGROUND

The current research scope of Wireless Fidelity (Wi-Fi) technology includes bandwidth transmission of 320 MHz, and aggregation and coordination of multiple frequency bands. It is expected that the speed and throughput can be increased by at least four times compared with the existing standard. Its main application scenarios are video transmission, augmented reality (AR), virtual reality (VR), etc.

Currently, in the aggregation and coordination of multiple frequency bands, a maximum bandwidth to be supported is 320 MHz (160 MHz+160 MHz), and 240 MHz (160 MHz+ 80 MHz) and other bandwidths may also be supported.

SUMMARY

According to an example embodiment of the disclosure, a communication method is provided. The method includes: determining a first message frame, in which the first message frame includes first information, and the first information is configured to indicate at least one of a support capability of applying a single-type resource unit of a first size to a 4096-Quadrature Amplitude Modulation (QAM) or a support capability of applying a multi-type resource unit of the first size to the 4096-QAM; and sending the first message frame.

According to an example embodiment of the disclosure, a communication method is provided. The method includes: receiving a first message frame, in which the first message frame includes first information, and the first information is configured to indicate at least one of a support capability of applying a single-type resource unit of a first size to a 4096-Quadrature Amplitude Modulation (QAM) or a support capability of applying a multi-type resource unit of the first size to the 4096-QAM; and performing a communication operation based on the first message frame.

According to an example embodiment of the disclosure, an electronic device is provided. The electronic device includes a memory, a processor and a computer program stored on the memory and executable by the processor. When the computer program is executed by the processor, the above methods are performed.

According to an example embodiment of the disclosure, a non-transitory computer-readable storage medium having a computer program stored thereon is provided. When the computer program is executed by a processor, the above methods are performed.

BRIEF DESCRIPTION OF THE DRAWINGS

Example embodiments of the disclosure will be described in detail below with reference to the accompanying drawings, in which:

FIG. 1 is a schematic diagram illustrating a radio communication scenario according to an example embodiment of the disclosure.

FIG. 2 is a flowchart illustrating a communication method according to an example embodiment of the disclosure.

FIG. 3 is a flowchart illustrating another communication method according to an example embodiment of the disclosure.

FIG. 4 is a block diagram illustrating a communication apparatus according to an example embodiment of the disclosure.

DETAILED DESCRIPTION

The following description with reference to the accompanying drawings is provided to fully understand the various embodiments of the disclosure as defined by the appended claims and their equivalents. The various embodiments of the disclosure include various specific details, but such specific details are considered to be exemplary only. In addition, descriptions of well-known techniques, functions and constructions may be omitted for the sake of clarity and brevity.

The terms and words used in this disclosure are not limited to their written meaning, but are used only by the inventors to clearly and consistently understand the disclosure. Accordingly, for those skilled in the art, the description of the various embodiments of the disclosure is provided for illustrative purposes only, and is not intended to limit the disclosure.

It is understandable that, unless the context clearly indicates otherwise, the singular forms "a", "one", "said" and "the" used herein may also include plural forms. It is further understandable that the term "includes" as used in this disclosure refers to the presence of the described features, integers, steps, operations, components and/or assemblies, but does not exclude the presence or addition of one or more other features, integers, steps, operations, components, assemblies and/or groups thereof.

It is understandable that while the terms "first" and "second" may be used herein to describe various elements, these elements should not be limited by these terms. These terms are used only to distinguish one element from another. Therefore, without departing from the teachings of the example embodiments, the first element discussed below may be referred to as the second element.

It is understandable that when an element is referred to as being "connected" or "coupled" to another element, it may be directly connected or coupled to other elements, or intervening elements may also exist. In addition, as used herein, "connected" or "coupled" may include wireless connection or wireless coupling. The term "and/or" or the expression "at least one of . . . " used herein includes any and all combinations of one or more related listed items.

Unless otherwise defined, all terms used herein, including technical and scientific terms, have the same meaning as generally understood by those skilled in the art to which this disclosure belongs.

A current research scope of Wireless Fidelity (Wi-Fi) technology includes bandwidth transmission of 320 MHz, and aggregation and coordination of multiple frequency bands. It is expected that the speed and throughput can be increased by at least four times compared with the existing standard. Its main application scenarios are video transmission, augmented reality (AR), virtual reality (VR), etc.

The aggregation and coordination of multiple frequency bands mean that devices communicate with each other in frequency bands of 2.4 GHz, 5.8 GHz, and 6 to 7 GHz at the same time. For the simultaneous communication among devices in multiple frequency bands, a new media access control (MAC) mechanism needs to be defined to manage it. In addition, low-latency transmission is expected to be supported in the aggregation and coordination of multiple frequency bands.

Currently, in the aggregation and coordination of multiple frequency bands, a maximum bandwidth to be supported is 320 MHz (160 MHz+160 MHz), and 240 MHz (160 MHz+ 80 MHz) and other bandwidths may also be supported.

In the current Wi-Fi technology, not only the existing modulation modes of Quadrature Amplitude Modulation (QAM), e.g., 64 QAM, 256 QAM, 1 k QAM, etc., but also the modulation mode of 4 k QAM can be used. However, there is no application definition for 4 k QAM in the existing standards.

FIG. 1 is a schematic diagram illustrating a radio communication scenario according to an example embodiment of the disclosure.

In a wireless local area network (LAN), a basic service set (BSS) may consist of multiple stations (STAs). The STA may include an access point (AP) device and one or more non-AP devices in communication with the AP device. A BSS can be connected to a distribution system (DS) through its AP device, and then connected to another BSS, to form an extended service set (ESS).

The AP device is a wireless switch used for a wireless network, which is also a core of the wireless network. The AP device can be used as a wireless base station and is mainly used as a bridge to connect the wireless network to a wired network. By using the AP device, the wired network and the wireless network can be integrated.

As an example, the AP device may include software applications and/or circuits to enable other types of nodes in the wireless network to communicate with the outside and inside of the wireless network via the AP. For example, the AP device may be a terminal device or network device equipped with a Wi-Fi chip.

For example, the non-AP device may include, but is not limited to: a cellular phone, a smart phone, a wearable device, a computer, a personal digital assistant (PDA), a personal communication system (PCS) device, a personal information manager (PIM), a personal navigation device (PND), a global positioning system, a multimedia device, and an Internet of Things (IoT) device.

In FIG. 1, an AP device is communicating with three non-AP devices (non-AP 1, non-AP 2, and non-AP 3), which is only an example and is not limited in the embodiments of the disclosure. For example, the AP device and the non-AP device may be of any number and/or any type.

In an example embodiment of the disclosure, the AP device and the non-AP devices may each be a multi-link device (MLD), and thus the AP device and the non-AP device may be represented as AP MLD and non-AP STA MLD respectively. That is, the AP MLD and the non-AP STA MLD(s) support the function of simultaneously transmitting and/or receiving under multiple links at the same moment. For example, there may be a plurality of links at different frequencies between the AP MLD and the non-AP STA MLD, such as links respectively under 2.4 GHz, 5 GHz and 6 GHz, or links of the same or different bandwidths under 2.4 GHz, 5 GHz or 6 GHz. In addition, a plurality of channels may exist on each link. Communication methods and communication apparatuses according to the embodiments of the disclosure may be applied to the communication between the AP MLD and the non-AP STA MLD, i.e., may be applied to a multi-link communication environment.

In the current wireless communication technology, not only the existing QAM modes, such as 1 k QAM, but also 4 k QAM (also called 4096-QAM) are expected to be used. In addition, a single-type resource unit (also known as "Resource Unit" and represented by RU hereinafter) and a multi-type resource unit (also known as "multiple resource unit" and represented by MRU hereinafter) have been defined in the context of Orthogonal Frequency Division Multiple Access (OFDMA).

In the related art, when supporting a maximum of 1 k QAM, the supported RUs can be: 26-tone, 52-tone, 106-tone, 242-tone, 484-tone, 996-tone, and 2*996-tone. In addition, considering differences in hardware, the capability whether 1 k QAM can be applied to a RU that is smaller than 242-tone (e.g., 26-tone, 52-tone, 106-tone, 242-tone, 484-tone, 996-tone, or 2*996-tone) is identified. However, in the related art, a maximum of 4 k QAM can be supported and both the RU and the MRU can be applied. The RU smaller than 242-tone can be: 26-tone, 52-tone, or 106-tone, and the MRU smaller than 242-tone can be: 52+26-tone or 106+26-tone. Considering differences of hardware of the non-AP STA and the AP, the capabilities whether 4 k can be applied to the RU and the MRU smaller than 242-tone needs to be identified. However, the related art only identifies the cases of the 1 k QAM and the RU, which needs to be improved. In the following, for the sake of simplicity of description, the embodiments of the disclosure mainly focus on describing examples about both the RU and the MRU smaller than 242-tone as well as the 1 k QAM and the 4 k QAM, which is not limited in the disclosure. For example, the communication methods and the communication apparatuses according to the embodiments of the disclosure may also be applied to other types of RUs (e.g., 242-tone, 484-tone, 484+242-tone, 996-tone, 996+484-tone, 996+484+242-tone, 2*996-tone, 2*996+484-tone, 3*996-tone, 3*996+484-tone, 4*996-tone, etc.) and other types of QAMs. In addition, it is understandable that the above numerical values with respect to the RU and the MRU are illustrative only and are not intended for limiting.

FIG. 2 is a flowchart illustrating a communication method according to an example embodiment of the disclosure. The communication method illustrated in FIG. 2 may be a method performed by a transmitter. Correspondingly, another communication method described with reference to FIG. 3 is a method performed by a recipient. The methods illustrated in the embodiments of FIGS. 2 and 3 may be applied to a multi-link communication, i.e., the transmitter may be any of the AP MLD and the non-AP STA MLD described above, and correspondingly, the other one of the AP MLD and the non-AP STA MLD is the recipient, which is not limited in the disclosure. The communication methods depicted in FIGS. 2 and 3 may also be used for communications other than multi-link communication.

As illustrated in FIG. 2, at block 210, a first message frame is determined. In the case of multi-link communication, the first message frame is determined on any one of the multiple links between the transmitter and the recipient. According to the embodiment of the disclosure, there may be various ways of determining the first message frame. For example, the transmitter may generate the first message frame based on at least one of a network condition, a load condition, a hardware capability of a sending/receiving device, a service type, or an agreement in a relevant protocol, which is not limited in the embodiments of the disclosure. In the embodiment of the disclosure, the transmitter may obtain the first message frame from an external source, which is not limited in the embodiment of the disclosure.

If the transmitter is the AP MLD, the first message frame may be a beacon frame, a probe response frame, an association response frame, or a Re-association response frame. If the transmitter is the non-AP STA MLD, the first message frame may be a probe request frame, an association request frame, or a Re-association request frame. It is understandable that the examples of the first message frame described herein are illustrative only and are not intended to limiting the disclosure. Other types of frames are included within the scope of the disclosure.

In the embodiment of the disclosure, the first message frame includes first information, and the first information is configured to indicate one or more support capabilities of applying a single-type resource unit and/or a multi-type resource unit of a first size to a first type of QAM. In the following, an example of the first type of QAM is 4096-QAM. That is, the first information may indicate one or more support capabilities of applying the single-type resource unit and/or the multi-type resource unit of the first size to the 4096-QAM. According to the embodiment of the disclosure, the single-type resource unit and/or the multi-type resource unit of the first size may be a resource unit smaller than 242-tone. According to the embodiment, the multi-type resource unit may consist of single-type resource units. In an embodiment, the multi-type resource unit may consist of two single-type resource units and are related to the bandwidth. For example, the multi-type resource unit may at least include: a first single-type resource unit and a second single-type resource unit, the first single-type resource unit has a different number of tones than the second single-type resource unit. That is, the multi-type resource unit may include at least two different single-type resource unit. According to the embodiment of the disclosure, the single-type resource unit (i.e., the RU) smaller than 242-tone may be 26-tone, 52-tone, or 106-tone, and the multi-type resource unit (i.e., the MRU) smaller than 242-tone may be 52+26-tone or 106+26-tone. It is understandable that the numerical values of the RU and the MRU described herein are illustrative only and are not intended for limiting. Other feasible RUs and MRUs are included within the scope of this disclosure.

In another embodiment of the disclosure, the first message frame may include second information, and the second information may indicate one or more support capabilities of applying the single-type resource unit and/or the multi-type resource unit of the first size to a second type of QAM. In the following, an example of the second type of QAM may be 1024-QAM. That is, the second information may indicate one or more support capabilities of applying the single-type resource unit and/or the multi-type resource unit of the first size to the 1024-QAM. In addition, similar to the description above, the single-type resource unit (i.e., the RU) smaller than 242-tone may be 26-tone, 52-tone, or 106-tone, and the multi-type resource unit (i.e., the MRU) smaller than 242-tone may be 52+26-tone, or 106+26-tone.

It is understandable that, depending on the configuration of the transmitter device (e.g., hardware and/or software configuration), the first message frame may carry both the first information and the second information, or may carry either the first information or the second information. According to the embodiment of the disclosure, if the first information is set to support applying the single-type resource unit and/or the multi-type resource unit of the first size to the 4096-QAM, then the second information may be set to support applying the single-type resource unit and/or the multi-type resource unit of the first size to the 1024-QAM. In this case, the second information (for the case of 1024-QAM) may or may not be omitted.

In addition, according to the embodiment of the disclosure, the first information (for the case of 4096-QAM) and/or the second information (for the case of 1024-QAM) may be included in an extremely high throughput (EHT) physical layer (PHY) capability information element of the first message frame.

In the embodiment described above, if the transmitter is the AP MLD, the first message frame may be a beacon frame, a probe response frame, an association response frame, or a re-association response frame. In this case, the EHT PHY capability information may be encapsulated in the aforementioned frame to be sent by the AP MLD. For example, if the first message frame is a beacon frame, an order number of the EHT PHY capability information in a frame body of the beacon frame may be 90, which is only an example and is not limited in the disclosure. Furthermore, in the embodiment described above, if the transmitter is the non-AP STA MLD, the first message frame may be a probe request frame, an association request frame, or a re-association request frame. In this case, the EHT PHY capability information may be encapsulated in the aforementioned frame to be sent by the non-AP STA MLD.

For example, the first information and/or the second information may be identified in the EHT PHY capability information element, which is only an example and is not limited in the disclosure. The first information and/or the second information may also be carried in other information elements. The first information and the second information will be described in detail later with reference to Tables 1 to 4.

Firstly, an embodiment of the first information (for the case of 4096-QAM) is described in detail with reference to Tables 1 and 2.

According to the embodiment of the disclosure, the first information may include a first identifier and a second identifier. The first identifier is configured to indicate support capabilities of applying the single-type resource unit and the multi-type resource unit of the first size to a reception of the 4096-QAM. The second identifier is configured to indicate support capabilities of applying the single-type resource unit and the multi-type resource unit to a transmission of the 4096-QAM. For example, if the single-type resource unit and the multi-type resource unit of the first size are both smaller than 242-tone, the first information can be as shown in Table 1 below.

TABLE 1

| Rx 4096-QAM < 242-tone support | Tx 4096-QAM < 242-tone support |
| --- | --- |

As illustrated in Table 1, as an example, "Rx 4096-QAM<242-tone support" may correspond to a first identifier, to indicate the one or more support capabilities of applying the single-type resource unit and/or the multi-type resource unit of the first size to the reception of the 4096-QAM. For example, the "Rx 4096-QAM<242-tone support" may indicate the one or more support capabilities of applying the single-type resource unit smaller than 242-tone and/or the multi-type resource unit smaller than 242-tone to the reception of the 4096-QAM. If the first identifier (i.e., the "Rx 4096-QAM<242-tone support") is set to a first value (e.g., "1"), it indicates that the transmitter supports applying the single-type resource unit and/or the multi-type resource unit smaller than 242-tone to the reception of the 4096-

QAM. If the first identifier (i.e., the "Rx 4096-QAM<242-tone support") is set to a second value (e.g., "0"), it indicates that the transmitter does not support applying the single-type resource unit and/or the multi-type resource unit smaller than 242-tone to the reception of the 4096-QAM.

As illustrated in Table 1, as an example, "Tx 4096-QAM<242-tone support" may correspond to a second identifier, to indicate the support capabilities of applying the single-type resource unit and the multi-type resource unit of the first size to the transmission of the 4096-QAM. For example, the "Tx 4096-QAM<242-tone support" may indicate the support capabilities of applying the single-type resource unit smaller than 242-tone and the multi-type resource unit smaller than 242-tone to the transmission of the 4096-QAM. If the second identifier (i.e., "Tx 4096-QAM<242-tone support") is set to a first value (e.g., "1"), it indicates that the transmitter supports applying the single-type resource unit smaller than 242-tone and the multi-type resource unit smaller than 242-tone to the transmission of the 4096-QAM. If the second identifier (i.e., the "Tx 4096-QAM<242-tone support") is set to a second value (e.g., "0"), it indicates that the transmitter does not support applying the single-type resource unit smaller than 242-tone and the multi-type resource unit smaller than 242-tone to the transmission of the 4096-QAM. According to the embodiment of the disclosure, if the transmitter is an AP (e.g., AP MLD), the second identifier (i.e., the "Tx 4096-QAM<242-tone support") may be reserved because the AP MLD supports full function by default, i.e., supports all functions.

According to the embodiment of the disclosure, one bit may be used to identify the cases of both the RU and the MRU, i.e., both the first identifier and the second identifier in Table 1 may occupy one bit. In detail, "Rx 4096-QAM<242-tone support" may be set to "0" to indicate that the reception of the 4096-QAM (4 k QAM) on a subcarrier smaller than 242-tone (e.g., each of 26-tone, 52-tone, 52+26-tone, 106-tone, and 106+26-tone) is not supported. When "Rx 4096-QAM<242-tone support" is set to "1", it indicates that the reception of the 4096-QAM (4 k QAM) on the subcarrier smaller than 242-tone is supported. In addition, "Tx 4096-QAM<242-tone support" may be set to "0" to indicate that the transmission of the 4096-QAM (4 k QAM) on the subcarrier smaller than 242-tone (e.g., each of 26-tone, 52-tone, 52+26-tone, 106-tone, and 106+26-tone) is not supported, in which the "Tx 4096-QAM<242-tone support" is reserved for the AP MLD side. When the "Tx 4096-QAM<242-tone support" is set to "1", it indicates that the transmission of the 4096-QAM (4 k QAM) on the subcarrier smaller than 242-tone is not supported.

That is, in the embodiment described with reference to Table 1, for the reception of the 4096-QAM, the first identifier (e.g., "Rx 4096-QAM<242-tone support" that occupies one bit) may be used to indicate both the support capability of applying the single-type resource unit smaller than 242-tone and the support capability of applying the multi-type resource unit smaller than 242-tone, and for the transmission of the 4096-QAM, the second identifier (e.g., "Tx 4096-QAM<242-tone support" that occupies one bit) may be used to indicate both the support capability of applying the single-type resource unit smaller than 242-tone and the support capability of applying the multi-type resource unit smaller than 242-tone.

It is understandable that the above examples of the first identifier and the second identifier that respectively occupy one bit are for illustrative purposes only and are not for limiting the disclosure. For example, the first identifier and the second identifier may both occupy a plurality of bits to indicate which resource unit of the resource units smaller than 242-tone is supported for applying to the 4096-QAM. For example, the plurality of bits may correspond to the single-type resource units smaller than 242-tone and the multi-type resource units smaller than 242-tone respectively. Taking the first identifier as example, the first identifier (e.g., the "Rx 4096-QAM<242-tone support") may have three bits. When the first identifier is set to a value of "001", it indicates that the 26-tone is used for the reception of the 4096-QAM. When the first identifier is set to a value of "011", it indicates that 52-tone is used for the reception of the 4096-QAM. When the first identifier is set to a value of "010", it indicates that 106-tone is used for the reception of the 4096-QAM. When the first identifier is set to a value of "100", it indicates that 26-52-tone is used for the reception of the 4096-QAM. When the first identifier is set to a value of "101", it indicates that 106-52-tone is used for the reception of the 4096-QAM. It is understandable that the above setting examples are only examples and are not limited in the disclosure. For example, when the first identifier is set to a value of "111", it indicates that each of single-type resource units smaller than 242-tone and the multi-type resource units smaller than 242-tone may be applied to the reception of the 4096-QAM. In addition, the above setting examples of the first identifier may also be applied to the second identifier, and repeated descriptions are omitted herein for brevity.

With reference to the embodiments described above, the first information may be included in the EHT PHY capability information, so that the first identifier (e.g., the "Rx 4096-QAM<242-tone support") and the second identifier (e.g., "Tx 4096-QAM<242-tone support") shown in Table 1 may be identification bits in the EHT PHY capability information, and the EHT PHY capability information may be encapsulated in the first message frame as described above.

According to another embodiment of the disclosure, the first information may include a third identifier and a fourth identifier. In this embodiment, the third identifier and the fourth identifier may each include a plurality of bits (e.g., at least two bits). For example, at least one bit of the third identifier is configured to indicate a support capability of applying the single-type resource unit of the first size to the reception of the 4096-QAM, at least one bit of the third identifier is configured to indicate a support capability of applying the multi-type resource unit of the first size to the reception of the 4096-QAM, at least one bit of the fourth identifier is configured to indicate a support capability of applying the single-type resource unit of the first size to the transmission of the 4096-QAM, and at least one bit of the fourth identifier is configured to indicate a support capability of applying the multi-type resource unit of the first size to the transmission of the 4096-QAM. For example, if the single-type resource unit and the multi-type resource unit of the first size are both smaller than 242-tone, the first information can be as shown in Table 2 below.

TABLE 2

| Rx 4096-QAM < 242-tone RU support | Rx 4096-QAM < 242-tone MRU support | Tx 4096-QAM < 242-tone RU support | Tx 4096-QAM < 242-tone MRU support |
|---|---|---|---|

As illustrated in Table 2, the third identifier of the first information may include the "Rx 4096-QAM<242-tone RU support" and the "Rx 4096-QAM<242-tone MRU support".

For the sake of simplicity of description, the third identifier may be defined to occupy two bits, and these two bits may correspond to the "Rx 4096-QAM<242-tone RU support" and the "Rx 4096-QAM<242-tone MRU support" respectively, in Table 2. However, embodiments of the disclosure are not limited to this. For example, the third identifier may occupy more than two bits. For example, the "Rx 4096-QAM<242-tone RU support" in the third identifier may occupy a plurality of bits to indicate which singlet-type resource unit in the single-type resource units smaller than 242-tone is supported for applying to the reception of the 4096-QAM. For example, the "Rx 4096-QAM<242-tone MRU support" in the third identifier may occupy a plurality of bits to indicate which multi-type resource unit in the multi-type resource units less than 242-tone is supported for applying to the reception of the 4096-QAM.

At least one bit of the third identifier (e.g., at least one bit corresponding to the "Rx 4096-QAM<242-tone RU support") may indicate a support capability of applying a single-type resource unit smaller than 242-tone (e.g., 26-tone, 52-tone, or 106-tone) to the reception of the 4096-QAM. If the "Rx 4096-QAM<242-tone RU support" is set to a third value (e.g., 1), it indicates that applying the single-type resource unit smaller than 242-tone to the reception of the 4096-QAM is supported. If the "Rx 4096-QAM<242-tone RU support" is set to a fourth value (e.g., 0), it indicates that applying the single-type resource unit smaller than 242-tone to the reception of the 4096-QAM is not supported.

At least one bit of the third identifier (e.g., at least one bit corresponding to the "Rx 4096-QAM<242-tone MRU support") may indicate a support capability of applying a multi-type resource unit smaller than 242-tone (e.g., 52+26-tone or 106+26-tone) to the reception of the 4096-QAM. If the "Rx 4096-QAM<242-tone MRU support" is set to a third value (e.g., 1), it indicates that applying the multi-type resource unit smaller than 242-tone to the reception of the 4096-QAM is supported. If the "Rx 4096-QAM<242-tone MRU support" is set to a fourth value (e.g., 0), it indicates that applying the multi-type resource unit smaller than 242-tone to the reception of the 4096-QAM is not supported.

That is, for the reception of the 4096-QAM, the third identifier may have a plurality of bits to separately identify the RU and the MRU.

As illustrated in Table 2, the fourth identifier of the first information may include the "Tx 4096-QAM<242-tone RU support" and the "Tx 4096-QAM<242-tone MRU support". For simplicity of description, the fourth identifier may be defined to occupy two bits, and these two bits may correspond to the "Tx 4096-QAM<242-tone RU support" and the "Tx 4096-QAM<242-tone MRU support" in Table 2 respectively. However, embodiments of the disclosure are not limited to this. The fourth identifier may have more than two bits. For example, the "Tx 4096-QAM<242-tone RU support" in the fourth identifier may occupy a plurality of bits to indicate which single-type resource unit in the single-type resource units smaller than 242-tone is supported for applying to the transmission of the 4096-QAM. For example, the "Tx 4096-QAM<242-tone MRU support" in the fourth identifier may have a plurality of bits to indicate which multi-type resource unit in the multi-type resource units smaller than 242-tone is supported for applying to the transmission of the 4096-QAM.

At least one bit of the fourth identifier (e.g., at least one bit corresponding to the "Tx 4096-QAM<242-tone RU support") may indicate a support capability of applying the single-type resource unit smaller than 242-tone (e.g., 26-tone, 52-tone, or 106-tone) to the transmission of the 4096-QAM. If the "Tx 4096-QAM<242-tone RU support" is set to a third value (e.g., 1), it indicates that applying the single-type resource unit smaller than 242-tone to the transmission of the 4096-QAM is supported. If the "Tx 4096-QAM<242-tone RU support" is set to a fourth value (e.g., 0), it indicates that applying the single-type resource unit smaller than 242-tone to the transmission of the 4096-QAM is not supported.

At least one bit of the fourth identifier (e.g., at least one bit corresponding to the "Tx 4096-QAM<242-tone MRU support") may indicate a support capability of applying a multi-type resource unit smaller than 242-tone (e.g., 52+26-tone or 106+26-tone) to the transmission of the 4096-QAM. If the "Tx 4096-QAM<242-tone MRU support" is set to a third value (e.g., 1), it indicates that applying the multi-type resource unit smaller than 242-tone to the transmission of the 4096-QAM is supported. If the "Tx 4096-QAM<242-tone MRU support" is set to a fourth value (e.g., 0), it indicates that applying the multi-type resource unit smaller than 242-tone to the transmission of the 4096-QAM is not supported.

That is, for the transmission of the 4096-QAM, the fourth identifier may occupy a plurality of bits to separately identify the RU and the MRU.

Furthermore, according to the embodiment of the disclosure, if the transmitter is an AP (e.g., AP MLD), the fourth identifier (the "Tx 4096-QAM<242-tone RU support" and the "Tx 4096-QAM<242-tone MRU support") may be reserved.

According to the embodiment of the disclosure, two bits may be used to identify the cases of the RU and the MRU respectively, which include: a subdomain setting of the "Rx 4096-QAM<242-tone RU support", a subdomain setting of the "Rx 4096-QAM<242-tone MRU support", a subdomain setting of the "Tx 4096-QAM<242-tone RU support" and a subdomain setting of the "Tx 4096-QAM<242-tone MRU support". It is understandable that the examples of the third identifier and the fourth identifier both occupying two bits are for illustrative purpose only and are not limited in the disclosure.

Furthermore, with reference to the embodiments described above, the first information may be included in the EHT PHY capability information. The third identifier (the "Rx 4096-QAM<242-tone RU support" and the "Rx 4096-QAM<242-tone MRU support") and the fourth identifier (the "Tx 4096-QAM<242-tone RU support" and the "Tx 4096-QAM<242-tone MRU support") in Table 2 may be identification bits in the EHT PHY capability information, and the EHT PHY capability information may be encapsulated in the first message frame as described above.

The embodiments of the second information (for the case of 1024-QAM) are described in detail with reference to Tables 3 and 4.

According to the embodiment of the disclosure, the second information may include a fifth identifier and a sixth identifier. The fifth identifier is configured to indicate support capabilities of applying the single-type resource unit and the multi-type resource unit of the first size to the reception of the 1024-QAM, and the sixth identifier is configured to indicate support capabilities of applying the single-type resource unit and the multi-type resource unit of the first size to the transmission of the 1024-QAM. For example, if the single-type resource unit and the multi-type resource unit of the first size are both smaller than 242-tone, the second information can be as shown in Table 3 below.

TABLE 3

| Rx 1024-QAM < 242-tone support | Tx 1024-QAM < 242-tone support |
| --- | --- |

As illustrated in Table 3, as an example, the "Rx 1024-QAM<242-tone support" may correspond to the fifth identifier, to indicate the support capabilities of applying the single-type resource unit and the multi-type resource unit smaller than 242-tone to the reception of the 1024-QAM. As an example, the "Tx 1024-QAM<242-tone support" may correspond to the sixth identifier, to indicate the support capabilities of applying the single-type resource unit and the multi-type resource unit smaller than 242-tone to the transmission of the 1024-QAM. In addition to differences in the type of QAM, the values of the fifth identifier and the sixth identifier shown in Table 3 may be set in a manner similar to setting the values of the first identifier and the second identifier shown in Table 1 respectively, and repetitive descriptions are omitted herein for the sake of brevity. According to the embodiment of the disclosure, if the transmitter is an AP (e.g., AP MLD), the sixth identifier (Tx 1024-QAM<242-tone support) may be reserved, because the AP MLD supports full function by default, i.e., supports all functions.

That is, in the embodiment described with reference to Table 3, for the reception of the 1024-QAM, the fifth identifier (e.g., the "Rx 1024-QAM<242-tone support" having one bit) may be utilized to indicate the support capabilities of applying the single-type resource unit smaller than 242-tone and the multi-type resource unit smaller than 242-tone. For the transmission of the 1024-QAM, the sixth identifier (e.g., the "Tx 1024-QAM<242-tone support" having one bit) may be utilized to indicate the support capabilities of applying the single-type resource unit smaller than 242-tone and the multi-type resource unit smaller than 242-tone. It is understandable that the examples of the fifth identifier and the sixth identifier each occupying one bit are for illustrative purpose only and are not used to limit the disclosure. For example, the fifth identifier and the sixth identifier may each have a plurality of bits to indicate which resource unit in the resource units smaller than 242-tone is supported for applying to the 1024-QAM. In addition to differences in the type of the QAM, the embodiments described above with reference to Table 1 in which the first identifier and the second identifier occupy a plurality of bits may be similarly applied to Table 3, and repetitive descriptions are omitted for the sake of brevity.

In addition, with reference to the embodiments described above, the second information may be included in the EHT PHY capability information, so that the fifth identifier (e.g., the "Rx 1024-QAM<242-tone support") and the sixth identifier (e.g., the "Tx 1024-QAM<242-tone support") shown in Table 3 may be identification bits in the EHT PHY capability information, and the EHT PHY capability information may be encapsulated in the first message frame as described above.

In another embodiment of the disclosure, the second information may include a seventh identifier and an eighth identifier. In this embodiment, the seventh identifier and the eighth identifier may each include a plurality of bits (e.g., at least two bits). For example, at least one bit of the seventh identifier may indicate a support capability of applying the single-type resource unit of the first size to the reception of the 1024-QAM, at least one bit of the seventh identifier may indicate a support capability of applying the multi-type resource unit of the first size to the reception of the 1024-QAM, at least one bit of the eighth identifier may indicate a support capability of applying the single-type resource unit of the first size to the transmission of the 1024-QAM, and at least one bit of the eighth identifier may indicate a support capability of applying the multi-type resource unit of the first size to the transmission of the 1024-QAM. For example, if the single-type resource unit and the multi-type resource unit of the first size are both smaller than 242-tone, the second information can be as shown in Table 4 below.

TABLE 4

| Rx 1024-QAM < 242-tone RU support | Rx 1024-QAM < 242-tone MRU support | Tx 1024-QAM < 242-tone RU support | Tx 1024-QAM < 242-tone MRU support |
| --- | --- | --- | --- |

As illustrated in Table 4, the "Rx 1024-QAM<242-tone RU support" and the "Rx 1024-QAM<242-tone MRU support" may correspond to the seventh identifier of the second information. That is, for the reception of the 1024-QAM, the seventh identifier may have a plurality of bits to identify the single-type resource unit and the multi-type resource unit respectively. In Table 4, the "Tx 1024-QAM<242-tone RU support" and the "Tx 1024-QAM<242-tone MRU support" may correspond to the eighth identifier of the second information. That is, for the transmission of the 1024-QAM, the eighth identifier may have a plurality of bits to identify the single-type resource unit and the multi-type resource unit respectively. For simplicity of description, each of the seventh identifier and the eighth identifier may be defined to occupy two bits, i.e., each subdomain shown in Table 4 may have 1 bit, which is not limited in the disclosure. The seventh identifier and the eighth identifier may each have more than two bits. In addition to the differences in the type of the QAM, the values of the seventh identifier and the eighth identifier shown in Table 4 may be set in a setting manner similar to that of the third identifier and the fourth identifier shown in Table 2, respectively, and repetitive descriptions are omitted herein for the sake of brevity. According to the embodiment of the disclosure, if the transmitter is an AP (e.g., AP MLD), the eighth identifier (e.g., the "Tx 1024-QAM<242-tone RU support" and the "Tx 1024-QAM<242-tone MRU support") may be reserved.

According to the embodiment of the disclosure, two bits may be used to identify the cases of the single-type resource unit and the multi-type resource unit respectively, which include: a subdomain setting of the "Rx 1024-QAM<242-tone RU support", a subdomain setting of the "Rx 1024-QAM<242-tone MRU support", a subdomain setting of the "Tx 1024-QAM<242-tone RU support", and a subdomain setting of the "Tx 1024-QAM<242-tone MRU support". It is understandable that the examples of the seventh identifier and the eighth identifier both occupying two bits in Table 4 are for illustrative purpose only and are not used to limit the disclosure. For example, the "Rx 1024-QAM<242-tone RU support" in the seventh identifier may have multiple bits to indicate which single-type resource unit in the single-type resource units smaller than 242-tone is supported for applying to the reception of the 1024-QAM. For example, the "Rx 1024-QAM<242-tone MRU support" in the seventh identifier may have multiple bits to indicate which multi-type resource unit in the multi-type resource units smaller than 242-tone is supported for applying to the reception of the 1024-QAM. Similarly, the "Tx 1024-QAM<242-tone RU support" and the "Tx 1024-QAM<242-tone MRU support" in the eighth identifier may each have a plurality of bits.

Furthermore, with reference to the embodiment described above, the second information may be included in the EHT PHY capability information, and the seventh identifier (e.g., the "Rx 1024-QAM<242-tone RU support" and the "Rx 1024-QAM<242-tone MRU support") and the eighth identifier (e.g., the "Tx 1024-QAM<242-tone RU support" and the "Tx 1024-QAM<242-tone MRU support") may be identification bits in the EHT PHY capability information, and the EHT PHY capability information may be encapsulated in the first message frame as described above.

Furthermore, in the embodiment shown in Table 4, for the cases of the single-type resource unit (RU), a highly effective (HE) PHY capability information element of the first message frame may be reused to indicate the "Rx 1024-QAM<242-tone RU support" in the seventh identifier and the "1024-QAM<242-tone RU support" in the eighth identifier. That is, a plurality of bits of the seventh identifier may be included in different capability information elements. For example, the bit(s) corresponding to the "Rx 1024-QAM<242-tone MRU support" in the seventh identifier may be included in the EHT PHY capability information, while the bit(s) corresponding to the "Rx 1024-QAM<242-tone RU support" in the seventh identifier may be included in the HE PHY capability information. Similarly, a plurality of bits of the eighth identifier may be included in different capability information elements, and repetitive descriptions are omitted herein for brevity.

In addition, if the first information in Tables 1 and 2 indicates to support applying the single-type resource unit and/or the multi-type resource unit of the first size to the 4096-QAM, then the second information shown in Tables 3 and 4 may be set to indicate to support applying the single-type resource unit and/or the multi-type resource unit of the first size to the 1024-QAM. That is, for the reception and the transmission of the 4096-QAM, the identifier for indicating support for the 4096-QAM may also indirectly indicate support for the 1024-QAM.

In addition, as an example, the first information of the first message frame may indicate not only the support capabilities of applying the single-type resource unit and/or the multi-type resource unit of the first size to the 4096-QAM, but also the support capabilities of the single-type resource unit and/or the multi-type resource unit of the first size to the 1024-QAM. In this case, the first information shown in Table 1 may be changed to be that in Table 5, or the first information may include both included in Table 1 and Table 5. Furthermore, the information shown in Table 5 may be included in the EHT PHY capability information element of the first message frame.

TABLE 5

| Rx 4096-QAM&1024-QAM < 242-tone support | Tx 4096-QAM&1024-QAM < 242-tone support |
| --- | --- |

As illustrated in Table 5, the identifier corresponding to the "Rx 4096-QAM&1024-QAM<242-tone support" may indicate the support capabilities of applying the resource units (including the RU and the MRU) smaller than 242-tone to the reception of the 4096-QAM and the 1024-QAM. For example, if this identifier is set to 1, it indicates that all resource units smaller than 242-tone (including all RUs and MRUs smaller than 242-tone) are supported for applying to the 4096-QAM and the 1024-QAM. If this identifier is set to 0, it indicates that none of resource units smaller than 242-tone is supported for applying to the reception of the 4096-QAM and the 1024-QAM.

In Table 5, the identifier corresponding to the "Tx 4096-QAM & 1024-QAM<242-tone support" may indicate the support capabilities of applying resource units (including the RUs and the MRUs) smaller than 242-tone to the transmission of the 4096-QAM and the 1024-QAM. For example, if this identifier is set to 1, it indicates that all resource units smaller than 242-tone (including the RUs and the MRUs smaller than 242-tone) are supported for applying to the transmission of the 4096-QAM and the 1024-QAM. If this identifier is set to 0, it indicates that none of resource units smaller than 242-tone (including the RUs and the MRUs smaller than the 242-tone) is supported for applying to the transmission of the 4096-QAM and the 1024-QAM.

That is, in Table 5, for the reception and the transmission of the 4096-QAM and the 1024-QAM, one bit may be used to simultaneously identify the support capabilities of applying the resource units to both the 4096-QAM and the 1024-QAM, which is only an example and is not limited in the disclosure.

It is understandable that the values described above in Table 5 are illustrative only and are not used to limit the disclosure. For example, both the "Tx 4096-QAM & 1024-QAM<242-tone support" and the "Tx 4096-QAM & 1024-QAM<242-tone support" described in Table 5 may each have a plurality of bits to indicate which single-type resource unit in the single-type resource units smaller than 242-tone is supported for applying to the 4096-QAM and the 1024-QAM. In addition, the identifiers shown in Table 5 may be combined or integrated with the embodiments described above with reference to Tables 1 to 4, and repetitive descriptions are omitted herein for the sake of brevity.

Further, it is understandable that each of the elements in Tables 1 to 4 of the disclosure is independent, and the elements are listed in the same table as an example, but that does not mean that all of the elements in the table must exist at the same time as shown in the table. The value of each of these elements is independent of any other element value in Tables 1 to 4. Therefore, it is understandable by those skilled in the art that the value of each element in Tables 1 to 4 of the disclosure is an independent embodiment.

As illustrated in FIG. 2, at block 220, the first message frame is sent. The link used to send the first message frame may be the same as or different from the link used to determine the first message frame at block 210, which is not limited in the disclosure. The transmitter may notify the recipient of its capability information by sending the first message frame carrying the first information and/or the second information to the recipient, thereby enabling the transmitter and the recipient to communicate with each other according to the corresponding capabilities.

FIG. 3 is a flowchart illustrating another communication method according to an example embodiment of the disclosure. The communication method in FIG. 3 may be a method performed by the recipient. Corresponding to FIG. 2, the recipient may be one of the non-AP STA MLD and the AP MLD described above.

As illustrated in FIG. 3, at block 310, a first message frame is received. In a scenario of the multi-link communication, the recipient may receive the first message frame on any of the multiple links.

In the embodiment of the disclosure, the first message frame may include first information, and the first information may indicate one or more support capabilities of applying a single-type resource unit and/or a multi-type resource unit of a first size to a 4096-QAM.

According to the embodiment of the disclosure, the single-type resource unit and/or the multi-type resource unit of the first size may be a resource unit smaller than 242-tone.

According to the embodiment of the disclosure, the first information may include a first identifier and a second identifier. The first identifier is configured to indicate one or more support capabilities of applying the single-type resource unit and/or the multi-type resource unit of the first size to the reception of the 4096-QAM, and the second identifier is configured to indicate one or more support capabilities of applying the single-type resource unit and/or the multi-type resource unit of the first size to the transmission of the 4096-QAM. The embodiment may be similar to the embodiment described above in Table 1, and repetitive descriptions are omitted herein for brevity.

According to another embodiment of the disclosure, the first information may include a third identifier and a fourth identifier. Both the third identifier and the fourth identifier may have a plurality of bits. For example, at least one bit of the third identifier is configured to indicate a support capability of applying the single-type resource unit of the first size to the reception of the 4096-QAM, at least one bit of the third identifier is configured to indicate a support capability of applying the multi-type resource unit of the first size to the reception of the 4096-QAM, at least one bit of the fourth identifier is configured to indicate a support capability of applying the single-type resource unit of the first size to the transmission of the 4096-QAM, and at least one bit of the fourth identifier is configured to indicate a support capability of applying the multi-type resource unit of the first size to the transmission of the 4096-QAM. The embodiment may be similar to the embodiment described above in Table 2, and repetitive descriptions are omitted herein for brevity.

In another embodiment of the disclosure, the first message frame may also include second information. The second information may indicate one or more support capabilities of applying the single-type resource unit and/or the multi-type resource unit of the first size to the 1024-QAM.

According to the embodiment of the disclosure, the second information includes a fifth identifier and a sixth identifier. The fifth identifier is configured to indicate support capabilities of applying the single-type resource unit and the multi-type resource unit of the first size to the reception of the 1024-QAM, and the sixth identifier is configured to indicate support capabilities of applying the single-type resource unit and the multi-type resource unit of the first size to the transmission of the 1024-QAM. The embodiment may be similar to the embodiment described above in Table 3, and repetitive descriptions are omitted herein for brevity.

According to another embodiment of the disclosure, the second information may include a seventh identifier and an eighth identifier. The seventh identifier and the eighth identifier may each have a plurality of bits. For example, at least one bit of the seventh identifier is configured to indicate a support capability of applying the single-type resource unit of the first size to the reception of the 1024-QAM, at least one bit of the seventh identifier is configured to indicate a support capability of applying the multi-type resource unit of the first size to the reception of the 1024-QAM, at least one bit of the eighth identifier is configured to indicate a support capability of applying the single-type resource unit of the first size to the transmission of the 1024-QAM, and at least one bit of the eighth identifier is configured to indicate a support capability of applying the multi-type resource unit of the first size to the transmission of the 1024-QAM. The embodiment may be similar to the embodiment described above in Table 4, and repetitive descriptions are omitted herein for brevity.

According to the embodiment of the disclosure, if the first information is set to indicate to support applying the single-type resource unit and/or the multi-type resource unit of the first size to the 4096-QAM, the second information is set to indicate to support applying the single-type resource unit and/or the multi-type resource unit of the first size to the 1024-QAM. For example, the embodiment described above with reference to Table 5 may be applied herein, and repetitive descriptions are omitted herein for the sake of brevity. In this case, for example, the recipient may be informed of the support capabilities of applying the resource units to both the 4096-QAM and the 1024-QAM by analyzing the first information.

According to the embodiment of the disclosure, the first information and/or the second information is included in the EHT PHY capability information of the first message frame.

As illustrated in FIG. 3, at block 320, a communication operation is performed based on the first message frame. For example, the recipient may analyze or parse the first information and/or the second information carried in the first message frame to obtain the capability information of the transmitter, so as to select appropriate communication resources, modulation modes, and/or communication schemes to perform the communication operation.

The communication method described with reference to FIGS. 2 and 3 may identify the support capabilities of applying the single-type resource unit and the multi-type resource unit to the 4096-QAM and 1024-QAM, thereby improving the spectrum utilization.

Figure 4:
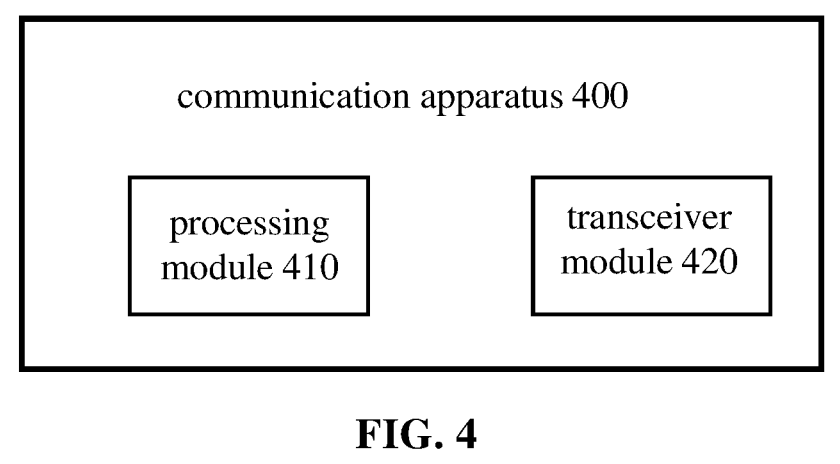

FIG. 4 is a block diagram illustrating a communication apparatus according to an example embodiment of the disclosure. The communication apparatus illustrated in FIG. 4 may be applied to a MLD, such as an AP MLD or a non-AP STA MLD, which is only an example and is not used to limit the disclosure.

As illustrated in FIG. 4, the communication apparatus 400 may include a processing module 410 and a transceiver module 420. In an embodiment, the communication apparatus illustrated in FIG. 4 may be applied to the transmitter to perform the method illustrated in FIG. 2. In another embodiment, the communication apparatus illustrated in FIG. 4 may be applied to the recipient to perform the method illustrated in FIG. 3.

According to the embodiment, the communication apparatus 400 illustrated in FIG. 4 may be applied to the transmitter. In this case, the processing module 410 is configured to: determine a first message frame. The first message frame includes first information, and the first information is configured to indicate one or more support capabilities of a single-type resource unit and/or a multi-type resource unit of a first size to the 4096-QAM. The transceiver module 420 is configured to: send the first message frame. In addition, the first message frame may include second information, and the second information is configured to indicate one or more support capabilities of applying the single-type resource unit and/or the multi-type resource unit of the first size to the 1024-QAM. That is, the communication apparatus 400 may perform the communication method described with reference to FIG. 2, and the first information and the second information may be similar to the embodiments described above with reference to Tables 1 and 4. Furthermore, the embodiment described with reference to Table 5 may also be applied to the embodiment of FIG. 4, and repetitive descriptions are omitted herein for the sake of brevity.

The communication apparatus 400 illustrated in FIG. 4 is applied to the recipient. In this case, the transceiver module 420 is configured to receive the first message frame. The first message frame may include first information, and the first information is configured to indicate one or more support capabilities of applying the single-type resource unit and/or the multi-type resource unit of the first size to the 4096-QAM. The processing module 410 may be configured to: perform a communication operation based on the first message frame. For example, the processing module 410 may control the transceiver module 420 to perform a communication operation based on the first message frame. For example, the processing module 410 may analyze or parse the first information and/or the second information carried in the first message frame to obtain the capability information of the transmitter, so as to select an appropriate communication resource, modulation mode, and/or communication scheme to perform the communication. In addition, the first message frame may also include second information, and the second information is configured to indicate one or more support capabilities of applying the single-type resource unit and/or the multi-type resource unit of the first size to the 1024-QAM. In this case, the communication apparatus 400 may perform the communication method described with reference to FIG. 3, and the first information and the second information may be similar to the embodiments described above with reference to Tables 1 and 4. In addition, the embodiment described with reference to Table 5 may also be applied to the embodiment of FIG. 4, and repetitive descriptions are omitted herein for the sake of brevity.

Furthermore, the communication apparatus 400 illustrated in FIG. 4 is merely an example and is not limited in the embodiment of the disclosure. For example, the communication apparatus 400 may include other modules, such as, for example, a memory module and the like. In addition, modules in the multi-link communication apparatus 400 may be combined into more complex modules or may be divided into more separate modules.

The communication apparatus 400 of the embodiment of the disclosure may identify the support capabilities of applying the single-type resource unit and the multi-type resource unit to the 4096-QAM and the 1024-QAM, thereby improving the spectrum utilization.

Based on the same principles as the methods according to the embodiments of the disclosure, the embodiment of the disclosure also provides an electronic device including a processor and a memory. The memory stores machine-readable instructions (which may also be referred to as "computer program"), and the processor is configured to execute the machine-readable instructions to perform the method described with reference to FIGS. 2 and 3.

The embodiment of the disclosure also provide a computer-readable storage medium, having a computer program stored thereon. When the computer program is executed by a processor, the method described with reference to FIGS. 2 and 3 is performed.

In an example embodiment, the processor may be a logic box, a module or a circuit for implementing or executing various embodiments described in the disclosure, for example, a central processing unit (CPU), a general processor, a digital signal processor (DSP), an application specific integrated circuit (ASIC), a field programmable gate array (FPGA), or other programmable logic devices, transistor logic devices, hardware components or any combination thereof. The processor may also be a combination used to implement a computing function, for example, a combination consisting of one or more microprocessors, and a combination consisting of DSPs and microprocessors.

In the example embodiments, the memory may be, for example, a read only memory (ROM), a random access memory (RAM), an electrically erasable programmable read only memory (EEPROM), a compact disc read only memory (CD-ROM) or other optical disc memories, optical disk memories (including compact disc, laser disc, CD-ROM, digital general disc, and Blu-ray disc), disk storage mediums or other magnetic storage devices, or any other medium that can be used to carry or store program codes in the form of instructions or data structures and can be accessed by a computer, which is not limited herein.

It is understandable that although the steps in the flowchart of the accompanying drawings are shown in sequence as indicated by arrows, these steps are not necessarily executed in sequence as indicated by the arrows. Unless clearly indicated in the context otherwise, the sequence of execution of these steps is not strictly limited, and these steps can be executed in other sequence. In addition, at least part of the steps in the flowchart of the accompanying drawings may include a plurality of sub-steps or stages. These sub-steps or stages are not necessarily completed at the same moment, but can be executed at different moments, and these sub-steps or stages are not necessarily performed sequentially, but can be executed alternately or alternatively with other steps or at least part of sub-steps or stages of the other steps.

Although the disclosure has been shown and described with reference to certain embodiments thereof, it will be understood by those skilled in the art that various changes in form and details can be made without departing from the scope of the disclosure. Therefore, the scope of the disclosure should not be limited to the embodiments, but should be defined by the appended claims and their equivalents.

What is claimed is:

1. A communication method, comprising:
   determining a first message frame, wherein the first message frame comprises first information, and the first information is configured to indicate at least one of a support capability of applying a single-type resource unit of a first size to a 4096-Quadrature Amplitude Modulation (QAM), or a support capability of applying a multi-type resource unit of the first size to the 4096-QAM; and
   sending the first message frame,
   wherein the first information comprises a first identifier and a second identifier,
   the first identifier is configured to indicate support capabilities of applying the single-type resource unit of the first size and the multi-type resource unit of the first size to a reception of the 4096-QAM, and
   the second identifier is configured to indicate support capabilities of applying the single-type resource unit of the first size and the multi-type resource unit of the first size to the transmission of the 4096-QAM.

2. The method of claim 1, wherein at least one of the single-type resource unit or the multi-type resource unit of the first size is a resource unit smaller than 242-tone.

3. The method of claim 2, wherein the first information in the first message frame is further configured to indicate at least one of a support capability of applying the single-type resource unit of the first size to a 1024-QAM, or a support capability of applying the multi-type resource unit of the first size to the 1024-QAM.

4. The method of claim 3, wherein the first information comprises a ninth identifier and a tenth identifier, the ninth identifier is configured to indicate support capabilities of applying the single-type resource unit of the first size and the multi-type resource unit of the first size to a reception of the 4096-QAM and the 1024-QAM, and the tenth identifier is configured to indicate support capabilities of applying the single-type resource unit of the first size and the multi-type resource unit of the first size to a transmission of the 4096-QAM and the 1024-QAM.

5. The method of claim 1, wherein the first message frame further comprises second information, and the second information is configured to indicate at least one of a support capability of applying the single-type resource unit of the first size to a 1024-QAM, or a support capability of applying a multi-type resource unit of the first size to the 1024-QAM.

6. The method of claim 5, wherein the second information comprises a fifth identifier and a sixth identifier, the fifth identifier is configured to indicate support capabilities of applying the single-type resource unit of the first size and the multi-type resource unit of the first size to a reception of the 1024-QAM; and the sixth identifier is configured to indicate support capabilities of applying the single-type resource unit of the first size and the multi-type resource unit of the first size to a transmission of the 1024-QAM, or wherein the second information comprises a seventh identifier and an eighth identifier, at least one bit of the seventh identifier is configured to indicate a support capability of applying the single-type resource unit of the first size to a reception of the 1024-QAM, at least one bit of the seventh identifier is configured to indicate a support capability of applying the multi-type resource unit of the first size to the reception of the 1024-QAM, at least one bit of the eighth identifier is configured to indicate a support capability of applying the single-type resource unit of the first size to a transmission of the 1024-QAM, and at least one bit of the eighth identifier is configured to indicate a support capability of applying the multi-type resource unit of the first size to the transmission of the 1024-QAM.

7. The method of claim 5, wherein at least one of the first information or the second information is included in an extremely high throughput (EHT) physical layer (PHY) capability information element of the first message frame.

8. The method of claim 5, wherein the second information is configured to indicate that applying at least one of the single-type resource unit or the multi-type resource unit of the first size to the 1024-QAM is supported in response to the first formation indicating that applying at least one of the single-type resource unit or the multi-type resource unit of the first size to the 4096-QAM is supported.

9. A non-transitory computer-readable storage medium having stored thereon a computer program that, when executed by a processor, causes the processor to perform the method of claim 1.

10. A communication method, comprising:

receiving a first message frame, wherein the first message frame comprises first information, and the first information is configured to indicate at least one of a support capability of applying a single-type resource unit of a first size to a 4096-Quadrature Amplitude Modulation (QAM), or a support capability of applying a multi-type resource unit of the first size to the 4096-QAM; and performing a communication operation based on the first message frame, wherein the first information comprises a first identifier and a second identifier, the first identifier is configured to indicate support capabilities of applying the single-type resource unit of the first size and the multi-type resource unit of the first size to a reception of the 4096-QAM, and the second identifier is configured to indicate support capabilities of applying the single-type resource unit of the first size and the multi-type resource unit of the first size to the transmission of the 4096-QAM.

11. The method of claim 10, wherein at least one of the single-type resource unit or the multi-type resource unit of the first size is a resource unit smaller than 242-tone.

12. The method of claim 11, wherein the first information in the first message frame is further configured to indicate at least one of a support capability of applying the single-type resource unit of the first size to a 1024-QAM, or a support capability of applying a multi-type resource unit of the first size to the 1024-QAM.

13. The method of claim 12, wherein the first information comprises a ninth identifier and a tenth identifier, the ninth identifier is configured to indicate support capabilities of applying the single-type resource unit of the first size and the multi-type resource unit of the first size to a reception of the 4096-QAM and the 1024-QAM, and the tenth identifier is configured to indicate support capabilities of applying the single-type resource unit of the first size and the multi-type resource unit of the first size to a transmission of the 4096-QAM and the 1024-QAM.

14. The method of claim 10, wherein the first message frame comprises second information, and the second information is configured to indicate at least one of a support capability of applying the single-type resource unit of the first size to a 1024-QAM, or a support capability of applying a multi-type resource unit of the first size to the 1024-QAM.

15. The method of claim 14, wherein the second information comprises a fifth identifier and a sixth identifier, the fifth identifier is configured to indicate support capabilities of applying the single-type resource unit and the multi-type resource unit of the first size to a reception of the 1024-QAM, and the sixth identifier is configured to indicate support capabilities of applying the single-type resource unit and the multi-type resource unit of the first size to a transmission of the 1024-QAM, or wherein the second information comprises a seventh identifier and an eighth identifier, at least one bit of the seventh identifier is configured to indicate a support capability of applying the single-type resource unit of the first size to a reception of the 1024-QAM, at least one bit of the seventh identifier is configured to indicate a support capability of applying the multi-type resource unit of the first size to the reception of the 1024-QAM, at least one bit of the eighth identifier is configured to indicate a support capability of applying the single-type resource unit of the first size to a transmission of the 1024-QAM, and at least one bit of the eighth identifier is configured to indicate a support capability of applying the multi-type resource unit of the first size to the transmission of the 1024-QAM.

16. The method of claim 14, wherein the second information is configured to indicate that applying at least one of the single-type resource unit or the multi-type resource unit of the first size to the 1024-QAM is supported in response to the first information indicating that applying at least one of the single-type resource unit or the multi-type resource unit of the first size to the 4096-QAM is supported.

17. The method of claim 14, wherein at least one of the first information or the second information is included in an EHT PHY capability information element of the first message frame.

18. An electronic device, comprising:
a processor; and
a memory storing a computer program executable by the processor,
wherein the processor is configured to:

determine a first message frame, wherein the first message frame comprises first information, and the first information is configured to indicate at least one of a support capability of applying a single-type resource unit of a first size to a 4096-Quadrature Amplitude Modulation (QAM), or a support capability of applying a multi-type resource unit of the first size to the 4096-QAM; and
send the first message frame,
wherein the first information comprises a first identifier and a second identifier,
the first identifier is configured to indicate support capabilities of applying the single-type resource unit of the first size and the multi-type resource unit of the first size to a reception of the 4096-QAM, and
the second identifier is configured to indicate support capabilities of applying the single-type resource unit of the first size and the multi-type resource unit of the first size to the transmission of the 4096-QAM.

* * * * *